(12) United States Patent
Wakao et al.

(10) Patent No.: US 8,468,805 B2
(45) Date of Patent: Jun. 25, 2013

(54) EXHAUST GAS PURIFICATION DEVICE AND EXHAUST GAS PURIFICATION METHOD FOR INTERNAL COMBUSTION ENGINE

(75) Inventors: Kazuhiro Wakao, Susono (JP); Takaaki Itou, Mishima (JP); Keisuke Sano, Susono (JP); Kimikazu Yoda, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 266 days.

(21) Appl. No.: 12/739,539

(22) PCT Filed: Sep. 30, 2008

(86) PCT No.: PCT/IB2008/002559
§ 371 (c)(1),
(2), (4) Date: Apr. 23, 2010

(87) PCT Pub. No.: WO2009/053798
PCT Pub. Date: Apr. 30, 2009

(65) Prior Publication Data
US 2010/0307141 A1     Dec. 9, 2010

(30) Foreign Application Priority Data
Oct. 25, 2007   (JP) .................................. 2007-277589

(51) Int. Cl.
*F01N 3/08* (2006.01)
(52) U.S. Cl.
USPC .................... 60/287; 60/286; 60/288; 60/295
(58) Field of Classification Search
USPC ................... 60/274, 276, 288, 297, 299, 286, 60/287, 295
See application file for complete search history.

(56) References Cited

U.S. PATENT DOCUMENTS 5,373,696 A * 12/1994 Adamczyk et al. ............. 60/276
5,979,158 A * 11/1999 Kaiser et al. .................... 60/274
(Continued)

FOREIGN PATENT DOCUMENTS

EP   1 186 764 A   3/2002
EP   1 203 878     5/2002
(Continued)

OTHER PUBLICATIONS

Machine Translation JP05-256124.*
(Continued)

*Primary Examiner* — Thomas Denion
*Assistant Examiner* — Dapinder Singh
(74) *Attorney, Agent, or Firm* — Finnegan, Henderson, Farabow, Garrett & Dunner, LLP

(57) ABSTRACT

A moisture adsorbent (32) for adsorbing moisture in exhaust gas and an NOx adsorbent (34) for adsorbing NOx are disposed in a bypass passage (30) for bypassing an exhaust passage (16) of an internal combustion engine (10). When an adsorption operation to the NOx adsorbent (34) is executed, inflow of the exhaust gas to the bypass passage (30) is allowed until the moisture amount that flows into the water adsorbent (32) reaches an allowable moisture inflow amount. The allowable moisture inflow amount is determined based on a residual moisture amount before the starting of the adsorption operation in the moisture adsorbent (32). The residual moisture amount in the water adsorbent (32) can be determined based on the temperature of the moisture adsorbent (32) at the immediately preceding execution of the purge operation.

17 Claims, 6 Drawing Sheets

U.S. PATENT DOCUMENTS

| | | |
|---|---|---|
| 6,000,217 A | 12/1999 | Hochmuth |
| 6,018,943 A * | 2/2000 | Martin et al. .................. 60/274 |
| 6,253,547 B1 | 7/2001 | Watanabe et al. |
| 6,378,298 B2 * | 4/2002 | Harima et al. .................. 60/288 |
| 6,397,586 B1 * | 6/2002 | Sakurai et al. .................. 60/288 |
| 7,243,487 B2 | 7/2007 | Shouda et al. |
| 2002/0007626 A1 | 1/2002 | Kitajima et al. |
| 2002/0053199 A1 | 5/2002 | Sato et al. |
| 2004/0237508 A1 | 12/2004 | Yamazaki et al. |
| 2010/0319327 A1 | 12/2010 | Sano et al. |

FOREIGN PATENT DOCUMENTS

| | | |
|---|---|---|
| FR | 2 789 730 A1 | 8/2000 |
| JP | 5-231134 | 9/1993 |
| JP | 5-256124 | 10/1993 |
| JP | 06-093829 A | 4/1994 |
| JP | 06-093840 A | 4/1994 |
| JP | 2000-297630 | 10/2000 |
| JP | 2002-115538 | 4/2002 |
| JP | 2004-68665 | 3/2004 |
| JP | 2006-342700 | 12/2006 |
| WO | WO 2009/109823 A1 | 9/2009 |

OTHER PUBLICATIONS

"Notification of Reason(s) for Refusal" in Japanese Patent Application 2007-277589, filed Oct. 25, 2007 (Drafting date: Oct. 1, 2009).

* cited by examiner

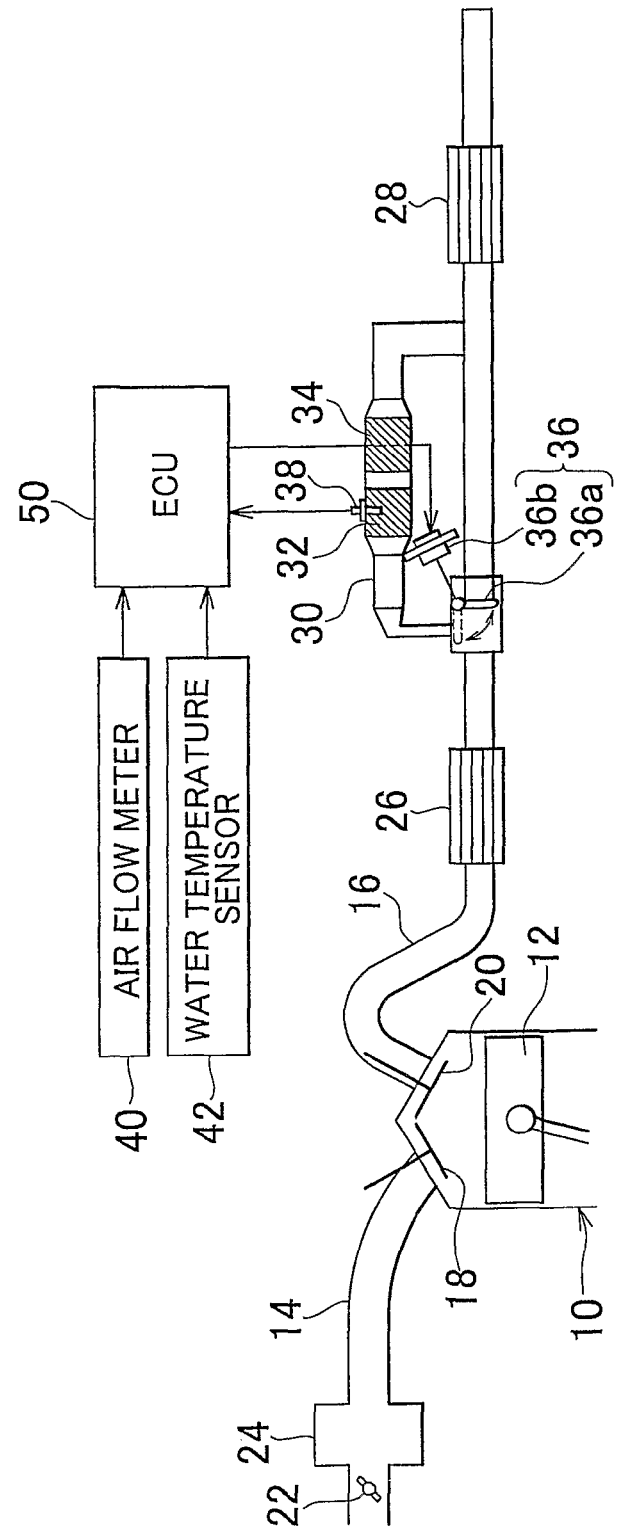

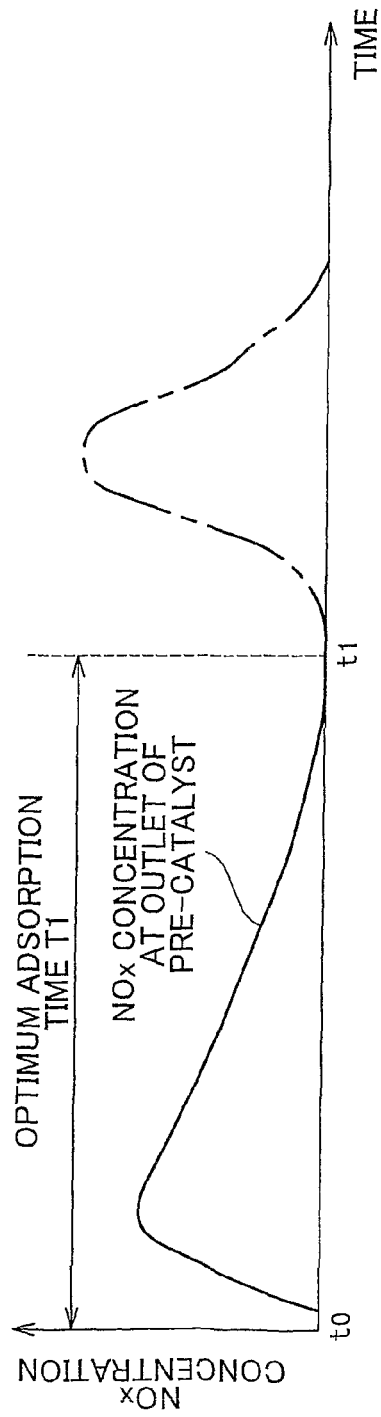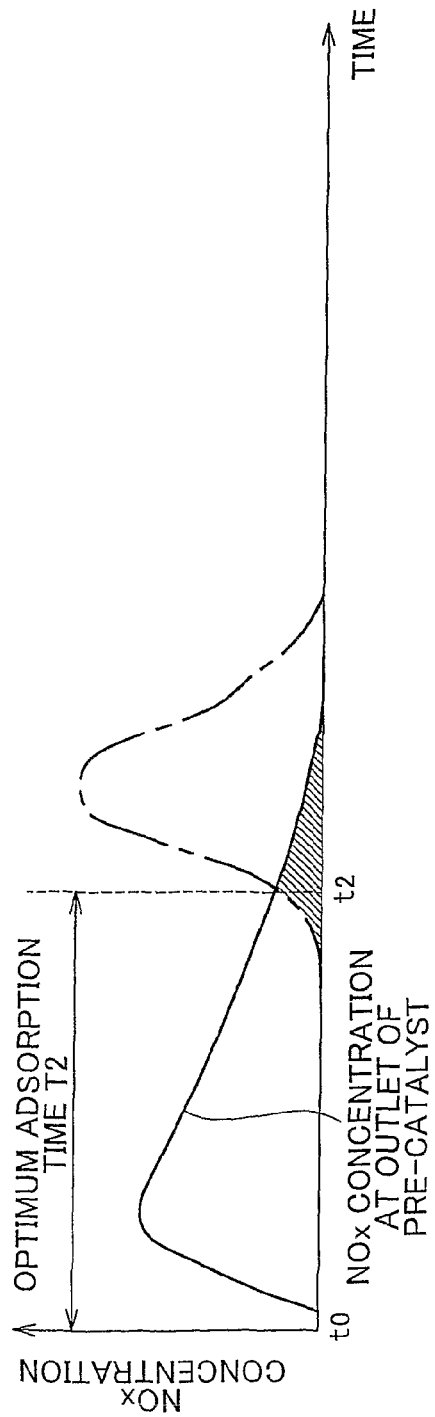

F I G . 3
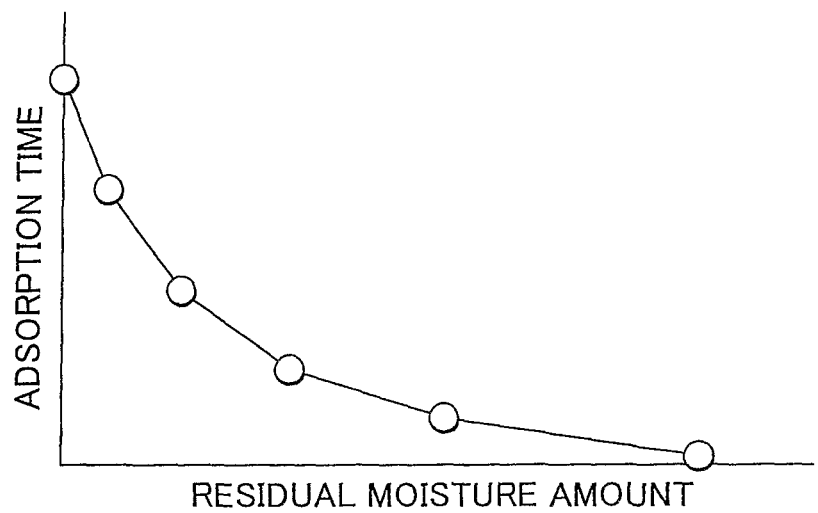
F I G . 4
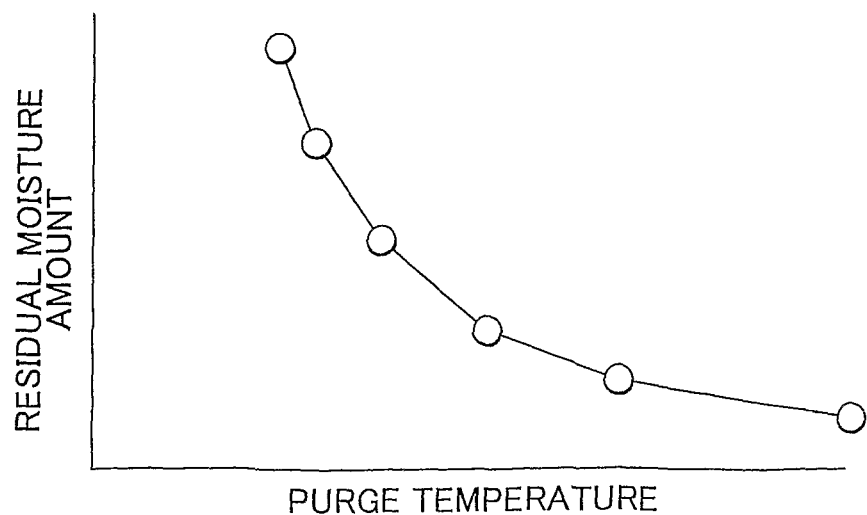

EXHAUST GAS PURIFICATION DEVICE AND EXHAUST GAS PURIFICATION METHOD FOR INTERNAL COMBUSTION ENGINE

CROSS-REFERENCE TO RELATED APPLICATIONS

This application is a national phase application of International Application No. PCT/IB2008/002559, filed Sep. 30, 2008, and claims the priority of Japanese Application No. 2007-277589, filed Oct. 25, 2007, the contents of both of which are incorporated herein by reference.

BACKGROUND OF THE INVENTION

1. Field of the Invention

The invention relates to an exhaust gas purification device and an exhaust gas purification method for an internal combustion engine.

2. Description of the Related Art

Recently an exhaust gas purification device is making remarkable advancements. However, at cold start, a discharge amount of toxic components, such as HC and NOx, tends to increase since the temperature of the catalyst (e.g. three-way catalyst) is low, and the activity of the catalyst is insufficient.

Using an adsorbent has been proposed as one method to reduce emissions at a cold start. In other words, the toxic components are adsorbed by an adsorbent immediately after the start of the engine until the catalyst reaches the activation temperature. Then after the catalyst is warmed up and activated, the adsorbed toxic component are desorbed from the adsorbent, and purified by the catalyst.

Japanese Patent Application Publication No. 5-256124 (JP-A-5-256124) discloses that if moisture has already been adsorbed in a hydrocarbon adsorbent before the hydrocarbon adsorbent adsorbs hydrocarbon, the hydrocarbon adsorption amount decreases, so a moisture absorbent is added before and after the hydrocarbon adsorbent so as to prevent air containing moisture from flowing into the hydrocarbon adsorbent when an engine is stopping (disclosed in the paragraphs [0003] and [0008] in JP-A-5-256124).

The technology disclosed in JP-A-5-256124 is for preventing the adsorption of moisture in air into the adsorbent when the engine is stopping, however considerable moisture is also contained in exhaust gas. Therefore, it is desirable to suppress moisture from flowing into the adsorbent as well when toxic components are adsorbed into the adsorbent. A possible method to implement this is to dispose a water adsorbent for adsorbing moisture at an upstream side of the toxic component adsorbent.

However, since considerable moisture is contained in the exhaust gas, it is possible that in some cases the water adsorbent becomes saturated during execution of the adsorption operation, and moisture, which could no longer be adsorbed, flows into the toxic component adsorbent. If moisture flows into the toxic component adsorbent, toxic components, once adsorbed, are desorbed from the toxic component adsorbent and flow out, and emission deteriorates.

SUMMARY OF THE INVENTION

It is an object of the present invention to provide an exhaust gas purification device and exhaust gas purification method for an internal combustion engine which is effective to reduce emission during cold start.

A first aspect of the invention relates to an exhaust gas purification device for an internal combustion engine includes a bypass passage that bypasses an exhaust passage of an internal combustion engine; an adsorbent which is disposed in the bypass passage and adsorbs moisture and toxic components in exhaust gas; and a control unit which allows inflow of the exhaust gas to the bypass passage until an amount of the moisture flowing into the adsorbent reaches an allowable moisture inflow amount when an adsorption operation at least to the adsorbent is executed.

As the moisture amount in the adsorbent becomes higher, the toxic component adsorption ability of the adsorbent decreases. Therefore, if the moisture amount in the adsorbent is excessively high, the toxic components once adsorbed are desorbed from the adsorbent, and released into the air. According to the first aspect, the moisture amount in the adsorbent is prevented from becoming excessively high by controlling the moisture amount that flows into the adsorbent, so as not to exceed the allowable moisture inflow amount, so the desorption of the toxic components can be reliably prevented. Since the adsorption operation can be continued until the moisture amount that flows into the adsorbent reaches the allowable moisture inflow amount, the adsorption ability of the adsorber can be fully expressed according to the allowable moisture inflow amount of the adsorber. Thus emission at a cold start can be sufficiently reduced.

In the first aspect, the bypass passage may bypass the exhaust passage between a pre-catalyst and a post-catalyst disposed in the exhaust passage.

In the first aspect, the allowable moisture inflow amount may be determined based on a residual moisture amount before the start of the adsorption operation in the adsorbent.

According to the above aspect, the allowable moisture inflow amount, when the adsorption operation is executed, can be determined appropriately, and the adsorption ability of the adsorption material can be fully expressed while reliably preventing the desorption of the toxic components.

In the above aspect, the adsorbent may include a toxic component adsorbent that adsorbs primarily toxic components, and a moisture adsorbent which is disposed on an upstream side of the toxic component adsorbent and has a function to adsorb moisture, and the residual moisture amount may be a residual moisture amount in the moisture adsorbent.

According to the above aspect, the allowable moisture inflow amount can be determined based on the residual moisture amount in the moisture adsorbent when the adsorbent is separated into the toxic component adsorbent and moisture adsorbent. Thus the moisture passing through the moisture adsorbent and flowing into the toxic component adsorbent during execution of the adsorption operation can be reliably suppressed. Hence the adsorption ability of the toxic component adsorber can be fully expressed while preventing the desorption of the toxic components.

In the above aspect, the control unit may calculate an adsorption operation execution time threshold so that the moisture amount which flows into the adsorbent becomes the allowable moisture inflow amount, and allow the inflow of the exhaust gas into the bypass passage until the elapsed time, since the start of the adsorption operation, reaches the adsorption operation execution time threshold when the adsorption operation is executed.

According to the above aspect, the adsorption operation execution time threshold, with which the moisture amount that flow into the adsorbent becomes the allowable moisture inflow amount, can be calculated, and the execution of the adsorption operation can be enabled until the elapsed time since the start of the adsorption operation reaches the adsorption operation execution time threshold. Thus the moisture amount that flows into the adsorbent during the execution of the adsorption operation can be accurately controlled, and the adsorption ability of the adsorbent can be fully expressed while reliably preventing the desorption of the toxic components.

In the above aspect, the control unit may calculate an exhaust gas amount threshold so that the moisture amount, which flows into the adsorbent, becomes the allowable moisture inflow amount, and allow the inflow of the exhaust gas into the bypass passage until an integrated exhaust gas amount, since the start of the adsorption operation, reaches the exhaust gas amount threshold when the adsorption operation is requested.

According to the above aspect, the exhaust gas amount threshold, with which the moisture amount that flows into the adsorbent becomes the allowable moisture inflow amount, can be calculated, and the execution of the adsorption operation can be enabled until the integrated exhaust gas amount, since the start of the adsorption operation reaches the exhaust gas amount threshold. Thus the moisture amount that flows into the adsorbent during execution of the adsorption operation can be accurately controlled, and the adsorption ability of the adsorbent can be fully expressed while reliably preventing the desorption of the toxic components.

In the above aspect, a temperature sensor for detecting a temperature of the adsorbent may be further included. The control unit may determine the allowable moisture inflow amount based on a temperature of the adsorbent when a purge operation to purge moisture and toxic components adsorbed into the adsorbent has been executed at an immediately preceding time.

According to the above aspect, the allowable moisture inflow amount can be determined based on the temperature of the adsorbent at the previous execution of the purge operation, thus the allowable moisture inflow amount can be accurately set.

In the above aspect, the control unit may determine a residual moisture amount based on a temperature of the adsorbent at the termination of the purge operation.

A second aspect of the invention relates to an exhaust gas purification device for an internal combustion engine includes a bypass passage that bypasses an exhaust passage of an internal combustion engine; an adsorbent which is disposed in the bypass passage and adsorbs moisture and toxic components in the exhaust gas; a passage switching valve that switches between a state of allowing the inflow of the exchange gas into the bypass passage and a state of not allowing inflow of the exhaust gas into the bypass passage; a residual moisture amount acquisition unit that acquires at least one of a residual moisture amount before the start of the adsorption operation in the adsorbent or a correlated value thereof; and an adsorption operation control unit that corrects a termination condition of the adsorption operation to decrease a period during which the adsorption operation is executed as the residual moisture amount increases, based on results of the acquisition by the residual moisture amount acquisition unit when the adsorption operation is executed.

As the residual moisture amount in the adsorbent becomes higher, the toxic component adsorption capability of the adsorber decreases. According to the above second aspect, the adsorption operation is shortened if the residual moisture amount is high, thus it can be reliably prevented that the toxic components once adsorbed are desorped from the adsorbent and released into the air. In the case when the residual moisture amount is low and the toxic component adsorption ability of the adsorbent is high, the adsorption operation can be executed for a long time, so the adsorption ability thereof can be fully expressed. Thus emission during cold start can be sufficiently reduced.

In the second aspect, the bypass passage may bypass the exhaust passage between a pre-catalyst and a post-catalyst disposed in the exhaust passage.

In the above aspect, the passage switching valve may select the state of allowing an inflow of exhaust gas into the bypass passage when the adsorption operation is executed, and may select the state of not allowing an inflow of exhaust gas into the bypass passage when a termination condition of the adsorption operation is satisfied.

In the above aspect, the adsorbent may include a toxic component adsorbent for adsorbing primarily toxic components and a moisture adsorbent which is disposed on an upstream side of the toxic component adsorbent, and has a function to adsorb moisture, and the residual moisture amount may be a residual moisture amount in the moisture adsorbent.

According to the above aspect, when the adsorbent is separated into a toxic component adsorbent and a moisture adsorbent, the termination condition of the adsorption operation can be corrected in a direction of decreasing the adsorption operation as the residual moisture amount in the moisture adsorbent becomes higher. Thus it can be reliably suppressed that the moisture passes through the moisture adsorbent and flows into the toxic component adsorbent when the adsorption operation is executed.

In the above aspect, a terminal condition of the adsorption operation may be that an elapsed time, since the start of the adsorption operation, reaches a predetermined adsorption operation execution time threshold, and the adsorption operation control unit may correct the adsorption operation execution time threshold to be decreased as the residual moisture amount increases.

According to the above aspect, when a termination condition of the adsorption operation is that an elapsed time, since the start of the adsorption operation, reaches a predetermined adsorption operation execution time threshold, the termination timing of the adsorption operation can be accurately controlled to an optimum timing in accordance with the residual moisture amount. Thus the adsorption ability of the adsorbent can be expressed to the maximum, while more reliably preventing desorption of the toxic components.

In the above aspect, a termination condition of the adsorption operation may be that an integrated exhaust gas amount since the start of the adsorption operation reaches a predetermined exhaust gas amount threshold, and the adsorption operation control unit may correct the exhaust gas amount threshold to be decreased as the residual moisture amount increases.

According to the above aspect, when the termination condition of the adsorption operation is that the integrated exhaust gas amount since the start of the adsorption operation reaches a predetermined exhaust gas amount threshold, the termination timing of the adsorption operation can be accurately controlled to an optimum timing in accordance with the residual moisture amount. Thus the adsorption ability of the adsorbent can be expressed at the maximum, while more reliably preventing desorption of the toxic components.

In the above aspect, an air flow meter, that detects the intake air amount, may be further included. The adsorption operation control unit may calculate the integrated exhaust gas amount based on the intake air amount detected by the air flow meter.

In the above aspect, a temperature sensor, that detects the temperature of the adsorbent, and a purge control unit, that performs a purge operation to purge moisture and toxic components adsorbed by the adsorbent, may be further included. The residual moisture amount acquisition unit may acquire a temperature of the adsorbent which is detected by the temperature sensor in the immediately preceding purge operation as the correlated value of the residual moisture amount.

According to the above aspect, the termination timing of the adsorption operation can be accurately controlled to an optimum timing in accordance with the residual moisture amount.

In the above aspect, a temperature sensor that detects a temperature adsorbent, a purge unit that performs purge operation to purge moisture and toxic components adsorbed by the adsorbent, and a purge termination control unit that terminates the purge operation when the temperature of the adsorbent reaches a predetermined temperature, may be included.

According to the above aspect, the purge operation is terminated when the temperature of the adsorbent reaches a predetermined temperature, whereby the residual moisture amount of the adsorbent can be fully suppressed regardless the fluctuation of the operation conditions of the internal combustion engine during execution of the purge operation. Thus, the adsorption ability of the adsorbent in the next cold start can be increased, and emission at cold start can be reliably decreased.

A third aspect of the invention relates to an exhaust gas purification method is an exhaust gas purification method used for an exhaust gas purification device for an internal combustion engine, which includes a bypass passage that bypasses an exhaust passage of an internal combustion engine, an adsorbent which is disposed on the bypass passage and adsorbs moisture and toxic components in exhaust gas, and a passage switching valve that switches between a state of allowing inflow of the exhaust gas into the bypass passage and a state of not allowing inflow of the exhaust gas into the bypass passage, the method having the steps of: acquiring at least one of a residual moisture amount before the start of the adsorption operation by the adsorbent in the adsorbent, or a correlated value thereof; and correcting a termination condition of the adsorption operation to decrease a period during which the adsorption operation is executed as the residual moisture amount increases, based on results of the acquisition by the residual moisture amount acquisition unit when the adsorption operation is executed.

In the above third aspect, moisture and toxic components that are adsorbed into the adsorbent may be purged, and a temperature of the adsorbent, which is detected by a temperature sensor for detecting a temperature of the adsorbent in the immediately preceding purge operation, may be acquired as the correlated value of the residual moisture amount, and the purge operation may be terminated when the temperature of the adsorbent reaches a predetermined temperature.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 1 is a diagram depicting a system configuration according to first embodiment of the invention;

FIGS. 2A and 2B are diagrams depicting NOx concentrations in exhaust gas at cold start according to the first embodiment of the invention, where FIG. 2A shows a case when the residual moisture amount of the moisture adsorbent is low, and FIG. 2B shows a case when the residual moisture amount is high;

FIG. 3 is a graph showing a relationship of the residual moisture amount of the moisture adsorbent and an optimum adsorption time according to the first embodiment of the invention;

FIG. 4 is a graph showing the relationship of a temperature of the moisture adsorbent at the termination of a purge operation and the residual moisture amount of the moisture adsorbent according to the first embodiment of the invention;

DETAILED DESCRIPTION OF EMBODIMENTS

Figure 5:
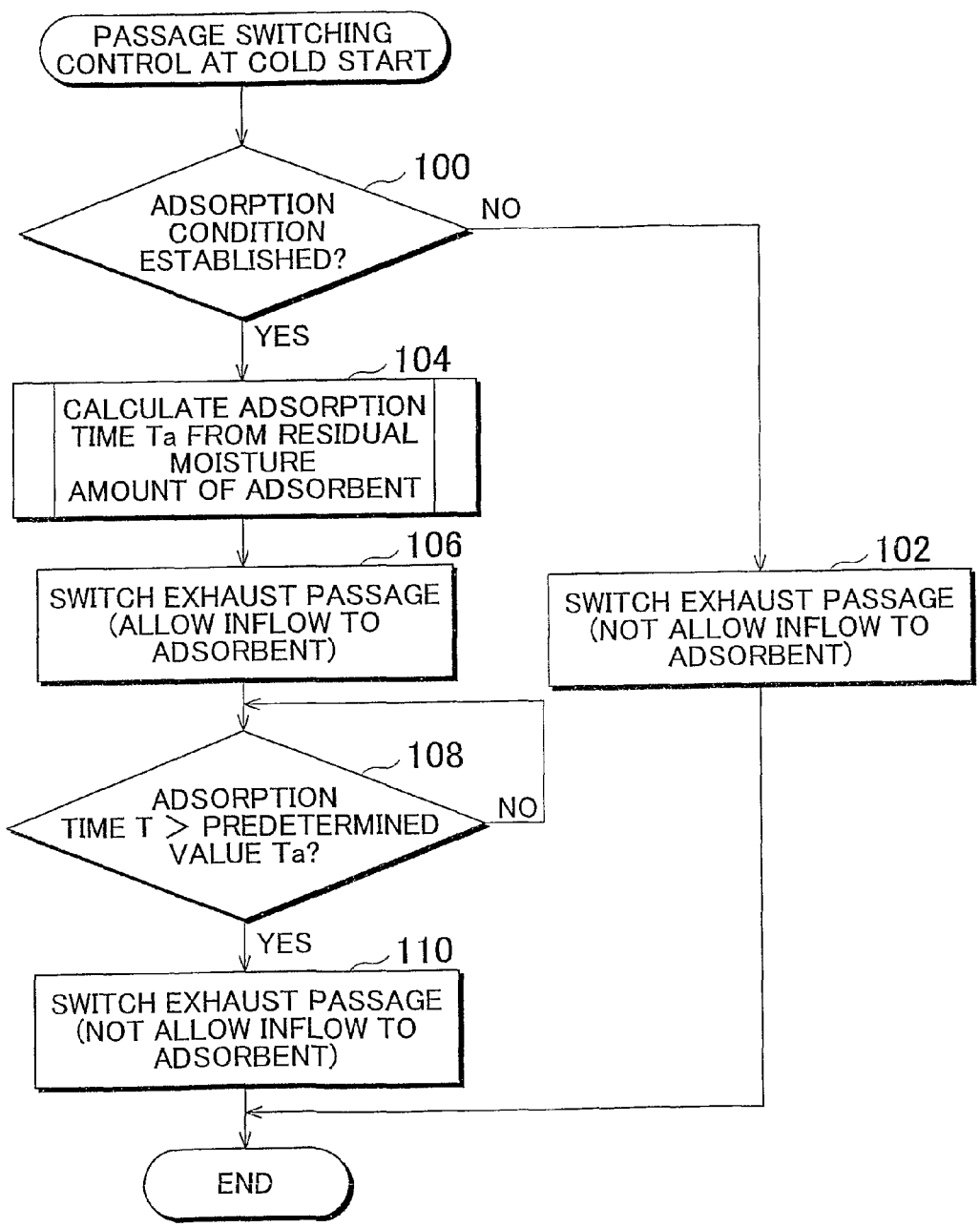
FIG. 5 is a flow chart showing a routine which is executed in the first embodiment of the invention.

Hereinafter, a first embodiment of the invention will be described with reference to the drawings. FIG. 1 is a diagram depicting a configuration of a system according to a first embodiment of the invention. The system of the first embodiment has an internal combustion engine 10 which is used as a drive source of a vehicle, for example. In a cylinder of the internal combustion engine 10, a piston 12 is disposed. An intake passage 14 and an exhaust passage 16 are connected to the internal combustion engine 10. The intake passage 14 is connected to an intake valve 18 of the internal combustion engine 10, and the exhaust passage 16 is connected to an exhaust valve 20 of the internal combustion engine 10. In the middle of the intake passage 14, a throttle valve 22, for adjusting an intake air amount, and a surge tank 24, are disposed.

In the middle of the exhaust passage 16, a pre-catalyst 26 and a post-catalyst 28, which is disposed at a down stream side of the pre-catalyst 26, are installed. The pre-catalyst 26 and the post-catalyst 28 are structured as a three-way catalyst respectively, which can purify exhaust gas.

In the exhaust passage 16 between the pre-catalyst 26 and the post-catalyst 28, a bypass passage 30, for bypassing this section of the exhaust passage 16, is disposed. In other words, both ends of the bypass passage 30 are connected to the exhaust passage 16 between the pre-catalyst 26 and post-catalyst 28.

In the bypass passage 30, a moisture adsorbent 32 and a NOx adsorbent 34, which is disposed at a down stream side of the moisture adsorbent 32, are installed. The moisture adsorbent 32 has a characteristic suitable for adsorbing moisture in the exhaust gas. The composing material of the moisture adsorbent 32 is not especially restricted, but can be a zeolite material, for example. A temperature sensor 38, for detecting the temperature of the moisture adsorbent 32, is disposed near the moisture adsorbent 32.

The NOx adsorbent 34 has a characteristic suitable for adsorbing NOx in the exhaust gas. The composing material of the NOx adsorbent 34 is not especially restricted, but palladium supported by cerium, or iron supported by zeolite, for example, can be used.

The moisture adsorbent 32 and NOx adsorbent 34 also have a function to adsorb HC. Hence, HC in exhaust gas can also be adsorbed by the moisture adsorbent 32 or NOx adsorbent 34.

A passage switching valve 36 is installed in an area where the bypass passage 30 branches from the exhaust passage 16, that is, at the upstream side edge of the bypass passage 30. The passage switching valve 36 is configured by a swing type valve body 36*a*, and an actuator 36*b* for driving the valve body 36*a*. According to this passage switching valve 36, a state of allowing the total amount of the exhaust gas flow into the bypass passage 30, and a state of allowing the exhaust gas flow not into the bypass passage 30 but directly into the exhaust passage 16, can be switched. The passage switching valve 36 may be able to switch to a state of allowing a part of the exhaust gas into the bypass passage 30.

The system of the first embodiment further has an Electronic Control Unit (ECU) 50. Not only the above mentioned throttle valve 22, passage switching valve 36 and temperature sensor 38, but also various sensors, including an air flow meter 40 for detecting intake air amount, and a water temperature sensor 42 for detecting temperature of engine cooling water, and various actuators, are electrically connected to the ECU 50.

Immediately after the cold start of the internal combustion engine 10, the activities of the pre-catalyst 26 and post-catalyst 28 are insufficient, since temperature thereof is low. Therefore, toxic components, such as NOx and HC, cannot be sufficiently purified by the pre-catalyst 26 and post-catalyst 28. Therefore according to the system, the exhaust gas flows into the bypass passage 30 by the passage switching valve 36 immediately after the cold start, so that NOx in the exhaust gas is adsorbed by the NOx adsorbent 34, and HC in exhaust gas is adsorbed by the moisture adsorber 32 or the NOx adsorbent 34 respectively. This operation hereafter is called the "adsorption operation". In the first embodiment, the toxic components discharged into the air can be decreased considerably by executing this adsorption operation at the cold start.

There is a limit, however, to the NOx adsorption ability of the NOx adsorbent 34. If the exhaust gas exceeds this limit and flows into the NOx adsorber 34, the NOx, which was once adsorbed, desorbs. Also during the adsorption operation, the temperature of the NOx adsorbent 34 increases due to the heat of the exhaust gas and the heat of the adsorption. If the temperature of the NOx adsorbent 34 increases, NOx, which was once adsorbed, tends to easily desorb. Thus, if the exhaust gas flows continuously into the bypass passage 30 after the engine starts, NOx is eventually desorbed from the NOx adsorbent 34. Hence, when the adsorption operation is executed, it is important to switch the passage switching valve 36 to a state of not allowing the exhaust gas to flow into the bypass passage 30 (that is, to terminate the adsorption operation) before NOx desorbs from the NOx adsorbent 34.

The adsorption ability of the NOx adsorbent 34 is sufficient if the NOx adsorbent 34 can continue adsorbing NOx until the pre-catalyst 26 is sufficiently activated after the cold start (until the NOx concentration at the outlet of the pre-catalyst 26 drops sufficiently). In reality, however, an enormous adsorbent capacity is required for the NOx adsorber 34 to have sufficient adsorption ability. This is because it is not always easy for the NOx adsorbent 34 to have sufficient adsorption ability in terms of installation space and cost of the NOx adsorbent 34, and the adsorption ability of the NOx adsorbent 34, under actual conditions, is limited. However if the adsorption operation is terminated too quickly, the adsorption ability of the NOx adsorbent 34 cannot be fully expressed, and the NOx discharge amount cannot be decreases sufficiently. Therefore, in order to minimize the NOx discharge amount when the engine is started, it is important to execute the adsorption operation as long as possible, within a range where NOx is not desorped from the NOx adsorbent 34.

NOx adsorbent 34 not only adsorbs NOx, but also has a property to adsorb moisture if moisture exists. If both NOx and moisture exist, the NOx adsorbent 34 has a property to adsorb moisture as a priority. Therefore, if moisture flows into the NOx adsorbent 34 which is in the state of adsorbing NOx, moisture is adsorbed by the NOx adsorbent 34, replacing NOx, so NOx is desorped from the NOx adsorbent 34 easily. Thus, in order to fully express the adsorption capability of the NOx adsorbent 34, it is necessary to prevent an inflow of moisture into the NOx adsorbent 34 during the adsorption operation. Therefore, according to the first embodiment, the moisture adsorbent 32 is installed at an upstream side of the NOx adsorbent 34. As a result, moisture in the exhaust gas can be adsorbed by the moisture adsorbent 32, and removed before the exhaust gas flows into the NOx adsorbent 34 during the adsorption operation.

After executing the adsorption operation, the moisture and toxic components adsorbed by the moisture adsorbent 32 and NOx adsorbent 34 must be removed for the next engine start. Hence a purge operation, to allow the exhaust gas to flow into the bypass passage 30, is executed by switching the passage switching valve 36 after the post-catalyst 28 is activated. In the purge operation, the moisture adsorbent 32 and NOx adsorbent 34 are heated by the heat of the exhaust gas, reaching a high temperature, whereby the moisture and toxic components are desorbed from the moisture adsorbent 32 and NOx adsorbent 34. The toxic components desorbed from the moisture adsorbent 32 and NOx adsorbent 34 are purified by the post-catalyst 28.

In the first invention, a method for the purge operation is not limited to the above mentioned method. For example, a purge passage, to connect the bypass passage 30 and the intake passage 14, may be installed, so that after the catalyst is activated, a part of exhaust gas is extracted from the exhaust passage 16, and is flown into the bypass passage 30, and moisture and toxic components adsorbed by the moisture adsorbent 32 and NOx adsorbent 34 are purged, and this purge gas is introduced into the intake passage 14 via the purge passage to perform the purge operation. In this case, the toxic components in the purge gas are burned in a tube of the internal combustion engine 10, or are purified by the pre-catalyst 26 or the post-catalyst 28.

As mentioned above, in order to minimize the NOx discharge amount at engine start, the termination timing of the adsorption operation cannot be too slow or too quick, and the adsorption operation must be terminated at an optimum timing. In the system shown in FIG. 1, an optimum adsorption operation termination timing changes according to the moisture amount which remains in the moisture adsorbent 32 before the start of the adsorption operation (before engine start) (hereafter called the "residual moisture amount of moisture adsorbent 32"). FIGS. 2A and 2B are diagrams depicting the above mentioned matters, where the abscissa indicates time, and the ordinate indicates NOx concentration in the exhaust gas. FIG. 2A shows a case when the residual moisture amount of the moisture adsorbent 32 is low, and FIG. 2B shows a case when the residual moisture amount of the moisture adsorbent 32 is high. These are graphs of the case when the internal combustion engine 10 is cold started at the origin (time t0) in the time axis.

(NOx Concentration at Outlet of Pre-Catalyst 26)

The solid curved line in FIG. 2A or 2B shows the NOx concentration at the outlet of the pre-catalyst 26. After the internal combustion engine 10 is started at time t0, the NOx concentration at the outlet of the pre-catalyst 26 rapidly increases. This is because the pre-catalyst 26 has not yet activated, and NOx is hardly purified by the pre-catalyst 26. Then the NOx concentration at the outlet of the pre-catalyst 26 reaches the peak, and gradually decreases as the temperature (activity) of the pre-catalyst 26 increases. When the pre-catalyst 26 is fully activated, the NOx concentration at the outlet of the pre-catalyst 26 becomes virtually zero.

In the post-catalyst 28, which is distant from the internal combustion engine 10, the temperature of the exhaust gas, which flow in, is low. Therefore the activation of the post-catalyst 28 is slower than the pre-catalyst 26. This means that the purification function of the post-catalyst 28 can hardly be expected immediately after a cold start. If it is assumed that no exhaust gas is allowed to flow into the bypass passage 30, the exhaust gas having the above mentioned NOx concentration would be directly released into the air. If the exhaust gas is allowed to flow into the bypass passage 30, on the other hand, the exhaust gas having the above mentioned NOx concentration flows into the bypass passage 30.

(NOx Discharge Characteristic in the Case of Continually Allowing Exhaust Gas to Flow into Bypass Passage 30)

The dash and dotted curved line in FIG. 2A or 2B shows the NOx concentration at the outlet of the NOx adsorber 34 in the case when the exhaust gas is continuously allowed to flow into the bypass passage 30 immediately after the engine start (time t0). In this case, NOx in the exhaust gas is removed by adsorption of the NOx adsorbent 34, so the NOx concentration of the exhaust gas released from the NOx adsorbent 34 is maintained at virtually zero. However, if the exhaust gas, which contains a large amount of moisture, is continuously allowed to flow into the bypass passage 30, the moisture adsorbent 32 saturates, and can no longer adsorb moisture, and moisture flows into the NOx adsorbent 34. Then NOx is desorbed from the NOx adsorbent 34, and exhaust gas, having high NOx concentration, is released at the downstream side of the NOx adsorbent 34 as the dash and dotted line in FIG. 2A or 2B shows.

When the moisture amount in the moisture adsorbent 32 reaches a predetermined amount, the moisture adsorbent 32 saturates, and can no longer adsorb moisture. If the exhaust gas is continuously allowed to flow into the bypass passage 30 even after the moisture adsorbent 32 saturates, the moisture passes through the moisture adsorbent 32, and flows into the NOx adsorbent 34. If the moisture flows into the NOx adsorbent 34, NOx is easily desorbed from the NOx adsorbent 34, as mentioned above.

(Case when Residual Moisture Amount of Moisture Adsorbent 32 is Low)

In the case when the residual moisture amount of the moisture adsorbent 32 is low, the margin, until the moisture adsorbent 32 reaches the saturation state, is relatively large. In other words, an allowable moisture inflow amount into the moisture adsorbent 32 is relatively high. Hence an inflow of moisture into the NOx adsorbent 34 can be prevented for a relatively long time after the start of the adsorption operation. Therefore the timing when the NOx is desorbed from the NOx adsorbent 34 can be relatively slow, as shown in FIG. 2A. In the case of the example shown in FIG. 2A, the NOx desorption timing can be delayed until the NOx concentration at the outlet of the pre-catalyst 26 drops to virtually zero. In such a case, the optimum operation termination timing is time $t_1$ in FIG. 2A. In other words, if the inflow of the exhaust gas to the bypass passage 30 is stopped by switching the passage switching valve 36 time $t_1$, desorption of the NOx, indicated by the dash and dotted line in FIG. 2A, can be stopped, so the NOx discharge amount at the engine start can be minimized (virtually zero in the case of the example in FIG. 2A).

(Case when Residual Moisture Amount of Moisture Adsorbent 32 is High)

In the case when the residual moisture amount of the moisture adsorbent 32 is high, the margin, until the moisture adsorbent 32 reaches the saturation state, is relatively small. In other words, an allowable moisture inflow amount into the moisture adsorbent 32 is relatively low. Hence the time when the inflow of moisture into the NOx adsorbent 34 can be prevented after the start of the adsorption operation is relatively short. Therefore, the timing when the NOx is desorbed from the NOx adsorbent 34 can be relatively quick, as shown in FIG. 2B. In the case of the example shown in FIG. 2B, the NOx desorption occurs before the NOx concentration at the outlet of the pre-catalyst 26 drops to zero. In such a case, the optimum adsorption operation termination timing is time $t_2$ in FIG. 2B. In other words, if the inflow of the exhaust gas to the bypass passage 30 is stopped by switching the passage switching valve 36 at time $t_2$, the desorption of the NOx, indicated by the dash and dotted line in FIG. 2B, can be stopped at time $t_2$, so the NOx discharge amount at the engine start can be minimized (to the shaded portion in FIG. 2B).

In this way, in the case of FIG. 2A in which the residual moisture amount of the moisture adsorbent 32 is low, the optimum adsorption time is indicated by $T_1$ in FIG. 2A, but in the case of FIG. 2B in which the residual moisture amount is high, the optimum adsorption time becomes shorter than this, and is indicated by $T_2$ in FIG. 2B. This means that the relationship of the residual moisture amount in the moisture adsorbent 32 and the optimum adsorption time is that the optimum adsorption time is shorter as the residual moisture amount becomes higher, as shown in FIG. 3.

Therefore, in the first embodiment, the execution of the adsorption operation is controlled according to the residual moisture amount of the moisture adsorbent 32, so that the execution time of the adsorption operation becomes shorter as the residual moisture amount becomes higher. Thereby the adsorption operation can be terminated at the optimum timing according to the residual moisture amount of the moisture adsorbent 32. As a consequence, it can be prevented that the NOx is desorbed from the NOx adsorbent 34 because the adsorption operation time is set too long when the residual moisture amount is high, or that the adsorption ability of the NOx adsorbent 34 is not fully expressed because the adsorption operation time is set too short when the residual moisture amount is low. In other words, the full adsorption ability of the NOx adsorbent 34 can always be used according to the residual moisture amount of the moisture adsorbent 32. Hence the NOx discharge amount at the engine start can be sufficiently decreased in general.

A method for determining the residual moisture amount of the moisture adsorbent 32 according to the first embodiment is to determine the residual moisture amount of the moisture adsorbent 32 based on the temperature of the moisture adsorbent 32 of the previous purge operation. In other words, the temperature of the moisture adsorbent 32 during execution of the purge operation is detected using the temperature sensor 38, and the residual moisture amount of the moisture adsorbent 32 is determined based on the temperature of the moisture adsorbent 32 at the termination of the purge operation. FIG. 4 shows the relationship of the temperature of the moisture adsorbent 32 at the termination of the purge operation and the residual moisture amount of the moisture adsorbent 32.

If the purge operation is executed, the temperature of the moisture adsorbent 32 increases due to the heat of the exhaust gas, as mentioned above, therefore the moisture adsorbed by the moisture adsorbent 32 can be purged (desorbed). However, moisture is also contained in the exhaust gas flowing into the moisture adsorbent 32 during the purge operation. This means that during the purge operation, adsorption of the moisture contained in the new exhaust gas that flows in and the desorption of the moisture continue in the moisture adsorbent 32, even after the original moisture which was adsorbed is purged. Therefore the moisture amount in the moisture adsorbent 32 changes depending on the balance of this adsorption amount and the desorption amount. As the temperature of the moisture adsorbent 32 becomes higher, the moisture amount in the balance state decreases, since moisture is more easily desorbed but less easily adsorbed. As a result, as FIG. 4 shows, the correlation that the residual moisture amount of the moisture adsorbent 32 decreases as the temperature of the moisture adsorbent 32 at the termination of the purge operation becomes higher, is generated. Hence the residual moisture amount can be accurately determined using the temperature of the moisture adsorbent 32 at the termination of the purge operation.

(Concrete Processing in First Embodiment)

FIG. 5 is a flow chart of a routine which the ECU 50 executes to implement the above mentioned functions according to the first embodiment. This routine is executed when the internal combustion engine 10 is started. According to this routine, it is first determined whether the execution condition to execute the adsorption operation is established (step 100). Concretely, temperatures of the pre-catalyst 26 and post-catalyst 28 are estimated based on the cooling water temperature of the engine. If the temperatures of the pre-catalyst 26 and post-catalyst 28 are sufficiently high and the catalyst purification function can be expected, it is determined that execution of the adsorption operation is unnecessary. In this case, the passage is switched by the passage switching valve 36, so as not to allow the exhaust gas to flow into the bypass passage 30 (step 102).

If the temperatures of the pre-catalyst 26 and post-catalyst 28 are low and the catalyst purification function is not expected in the above step 100, on the other hand, it is determined that the adsorption operation should be executed. In this case, the adsorption operation execution time threshold Ta is calculated as an optimum adsorption time, based on the residual moisture amount of the moisture adsorbent 32 (step 104). In the ECU 50, the above mentioned relationships shown in FIGS. 3 and 4 are stored. In step 104, the residual moisture amount is calculated first, based on the temperature of the moisture adsorbent 32 at the termination of the previous purge operation, which is stored in the ECU 50, using the map shown in FIG. 4, then the adsorption operation execution time threshold Ta is calculated based on the residual moisture amount using the map shown in FIG. 3. Or a map which determines the relationship of the temperature of the moisture adsorbent 32 at the termination of the previous purge operation and the adsorption operation execution time threshold Ta may be stored in ECU 50, so that the adsorption operation execution time threshold Ta is directly determined based on the temperature of the moisture adsorbent 32 at the termination of the previous purge operation.

After the processing in step 104, the passage is switched by the passage switching valve 36, so that the exhaust gas flows into the bypass passage 30 (step 106). Thereby, the adsorption operation is started.

During execution of the adsorption operation, the adsorption time T, which is time elapsed since the start of the adsorption operation, is measured, and it is monitored whether this adsorption time T reaches the adsorption operation execution time threshold Ta which was calculated in step 104 (step 108). If it is determined that the adsorption time T reached the adsorption operation execution time threshold Ta, the passage is switched by the passage switching valve 36 so that the exhaust gas does not flow into the bypass passage 30 (step 110). Thereby, the adsorption operation is terminated.

As described above, according to the processing of the routine shown in FIG. 5, the duration of the adsorption operation is controlled according to the residual moisture amount of the moisture adsorbent 32, so that the adsorption operation can be terminated at the point when the moisture amount that flows into the moisture adsorbent 32 reaches the allowable moisture inflow amount, with which the moisture adsorbent 32 does not exceed the saturation state. Therefore the adsorption ability of the NOx adsorbent 34 can be fully expressed during the adsorption operation, while reliably preventing the desorption of NOx from the NOx adsorbent 34. As a result, the NOx discharge amount into the air after a cold start can be minimized.

In the above mentioned first embodiment, the moisture adsorbent 32 and NOx adsorbent 34 function as the "adsorbents", and the temperature of the moisture adsorbent 32 at the termination of the previous purge operation is regarded as the "correlated value of the residual moisture amount". The ECU 50 functions as the "residual moisture amount acquisition unit" by acquiring the temperature of the moisture adsorbent 32 at the termination of the previous purge operation based on the detection signal of the temperature sensor 38, as the "adsorption operation control unit" by executing the processing in the above mentioned step 104, and as the "purge control unit" by executing the above mentioned purge operation.

According to the first embodiment, the temperature of the moisture adsorbent 32 is detected by the temperature sensor 38 when the purge operation is executed, but in the invention, the temperature of the moisture adsorbent 32 may be estimated based on the operation state of the internal combustion engine 10, without installing the temperature sensor 38.

According to the first embodiment, the residual moisture amount of the moisture adsorbent 32 is determined based on the temperature of the moisture adsorbent 32 at the previous purge operation, but in the invention, the method for determining the residual moisture amount of the moisture adsorbent 32 is not limited to this. For example, according to the invention, the residual moisture amount of the moisture adsorbent 32 may be determined by measuring the weight of the moisture adsorbent 32, and subtracting the weight of the moisture adsorbent 32 in a dried state from this weight.

According to the first embodiment, an adsorption operation termination condition is that the elapsed time since the start of the adsorption reaches the adsorption operation execution time threshold Ta, but an adsorption operation termination condition is not limited to this. For example, according to the present invention, the integrated exhaust gas amount of the internal combustion engine 10, since the start of the adsorption operation, may be calculated based on the intake air amount detected by the air flow meter 40, so that this integrated exhaust gas amount reaching a predetermined exhaust gas amount threshold is used as the adsorption operation termination condition. In this case, a similar effect as the first embodiment is implemented by correcting this exhaust gas amount threshold in a decreasing direction based on the residual moisture amount of the moisture adsorbent 32. The moisture amount that flows into the moisture adsorbent 32 correlates to the integrated exhaust gas amount at higher precision than the adsorption operation execution time. Hence if the integrated exhaust gas amount is used as an adsorption operation termination condition, the termination timing of the adsorption operation can be controlled to be an optimum timing at higher accuracy even if operation conditions, such as load and rotation speed, of the internal combustion engine 10 change during execution of the adsorption operation, and emission can be further decreased.

Figure 6:
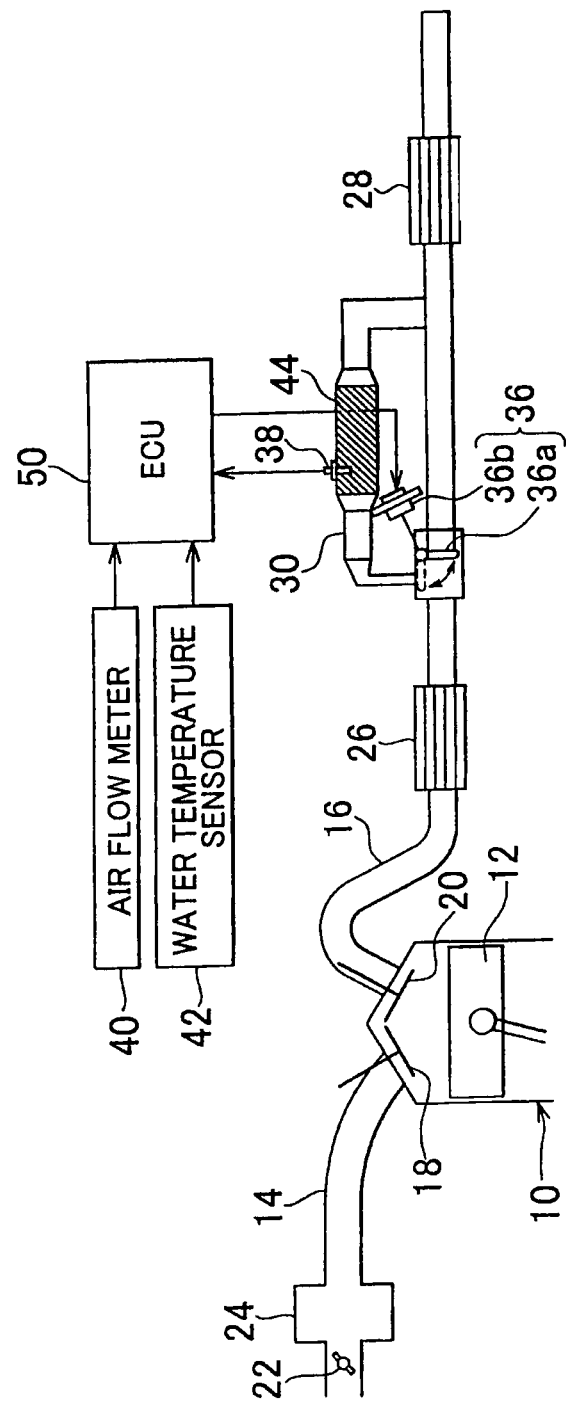
FIG. 6 is a diagram depicting a system configuration according to a second embodiment of the invention.

A second embodiment of the invention is described next with reference to FIG. 6, where the differences from the above mentioned first embodiment are primarily described, and description on similar matters is simplified or omitted. In the above mentioned first embodiment, the moisture adsorbent 32 and the NOx adsorbent 34 are separate bodies, but in the system of the second embodiment, these are integrated. In other words, as FIG. 6 shows, an adsorbent 44 is installed in the bypass passage 30, instead of the moisture adsorbent 32 and NOx adsorbent 34 of the first embodiment.

This adsorbent 44 has a function to adsorb both moisture and NOx. As the moisture amount in the adsorbent 44 increases, the NOx adsorption ability of the adsorbent 44 decreases. This means that as the residual moisture amount in the adsorbent 44 at the start of the adsorption operation becomes higher, the allowable moisture inflow amount into the adsorbent 44 becomes lower. Therefore in order to prevent desorption of NOx from the adsorbent 44 during the adsorption operation, the adsorption operation must be terminated sooner as the residual moisture amount in the adsorbent 44 becomes higher.

As a consequence, according to the second embodiment as well, adsorption ability of the adsorbent 44 can be fully expressed while reliably preventing desorption of NOx from the adsorbent 44, by performing control, similar to the first embodiment during adsorption operation. Hence NOx discharge amount into the air after a cold start can be minimized.

The second embodiment is the same as the first embodiment except for the above mentioned aspect, so further description is omitted.

A third embodiment of the invention is described next with reference to FIG. 7, where the differences from the above mentioned embodiments are primarily described, and description on similar matters is simplified or omitted. The third embodiment can be implemented by having the ECU 50 execute the later mentioned routine shown in FIG. 7, using the hardware configuration shown in FIG. 1.

The third embodiment is characterized in the control performed during the purge operation. As mentioned above, the moisture amount in the moisture adsorbent 32 during the execution of the purge operation fluctuates depending on the balance of the adsorption amount and desorption amount. The moisture amount determined by this balance is hereafter called the "balanced moisture amount". The balanced moisture amount is lower as the temperature of the moisture adsorbent 32 is higher, and becomes higher as the temperature of the moisture adsorbent 32 becomes lower. Therefore even if the moisture amount decreases because the temperature of the moisture adsorbent 32 rises to a high temperature during the execution of the purge operation, the moisture amount in the moisture adsorbent 32 increases again if the temperature of the moisture adsorbent 32 drops before termination of the purge operation. For example, even if the temperature of the moisture adsorbent 32 rises to 400° C. during execution of the purge operation, the final residual moisture amount of the moisture adsorbent 32 becomes the balanced moisture amount at 200° C. if the temperature of the moisture adsorbent 32 at the termination of the purge operation is 200° C. In such a case, the residual moisture amount of the moisture adsorbent 32 cannot be sufficiently decreased.

With the foregoing in view, according to the third embodiment, the purge operation is terminated by switching the passage switching valve 36 so that the exhaust gas does not flow into the bypass passage 30, once the temperature of the moisture adsorbent 32 reaches a predetermined temperature at which the balanced moisture amount becomes sufficiently low, during the execution of the purge operation.

(Concrete Processing in Third Embodiment)

Figure 7:
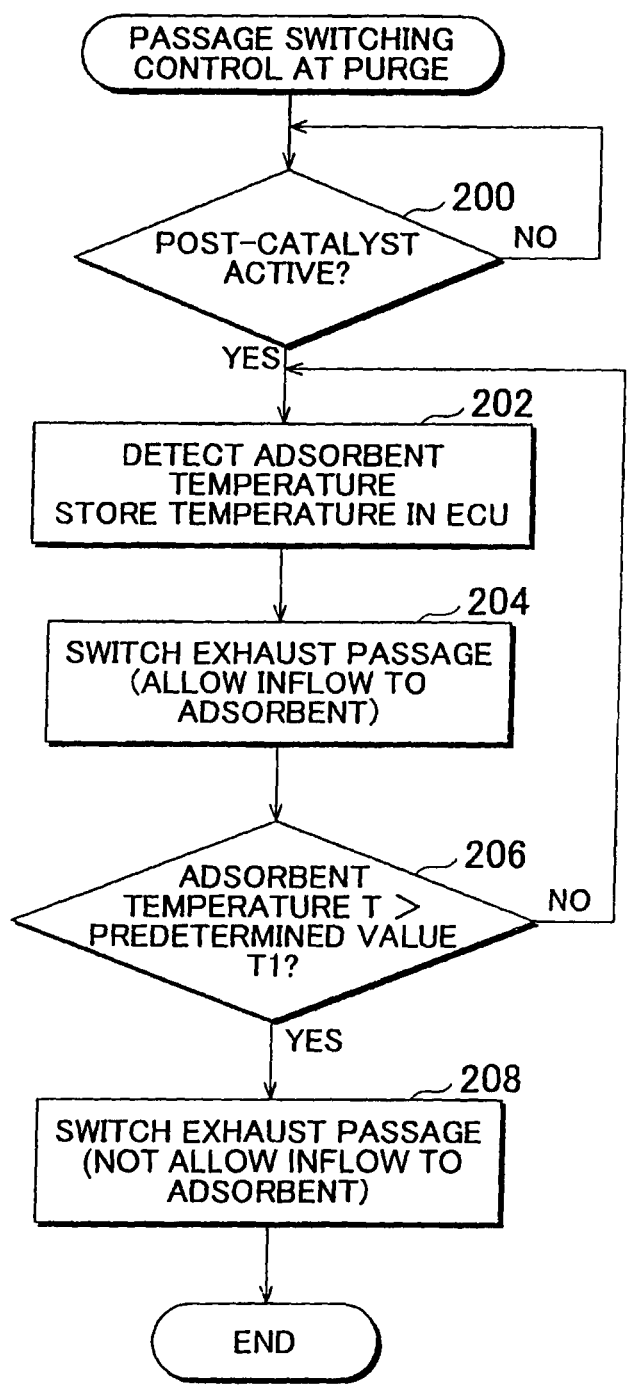
FIG. 7 is a flow chart showing a routine which is executed in a third embodiment of the invention.

FIG. 7 is a flow chart of the routine which the ECU 50 executes in the third embodiment to implement the above functions. This routine is executed after the termination of the adsorption operation. According to the routine, it is first determined whether the post-catalyst 28 has reached activation (step 200). Concretely, the temperature of the post-catalyst 28 is determined by a temperature sensor, which is not illustrated, or by estimation based on the integrated exhaust gas amount from the engine start or the like, whereby it is determined whether the post-catalyst 28 has reached the activation temperature or not.

If it is determined that the post-catalyst 28 has been activated in step 200, the purge operation is executed as follows. First, the latest value of the temperature of the moisture adsorbent 32, which is detected by the temperature sensor 38, is stored in the ECU 50 (step 202). Then the state of the passage switching valve 36 is controlled so that exhaust gas flows into the bypass passage 30 (step 204). And it is determined whether the temperature of the moisture adsorbent 32 acquired by step 202 reached a predetermined value T1 (step 206). This predetermined value T1 is preset as a temperature at which the balanced moisture amount in the moisture adsorbent 32 becomes sufficiently low.

If the temperature of the moisture adsorbent 32 has not reached the predetermined value T1 in step 206, the purge operation is continued by re-executing the above processing in step 202 and later. If the temperature of the moisture adsorbent 32 has reached the predetermined value T1, on the other hand, the passage switching valve 36 is switched so that the exhaust gas does not flow into the bypass passage 30 (step 208). Thereby, the purge operation is terminated. After the purge operation is terminated, the exhaust gas does not flow into the moisture adsorbent 32, so the moisture amount in the moisture adsorbent 32 no longer changes. In other words, according to the above mentioned control, the balanced moisture amount at the predetermined value T1 can become the residual moisture amount of the moisture adsorbent 32. Therefore the residual moisture amount of the moisture adsorbent 32 can be decreased regardless the change of the operation conditions during execution of the purge operation, whereby the adsorption ability of the NOx adsorbent 34 at the next cold start of the engine can be increased, and NOx discharge amount can be reliably decreased.

In the above mentioned third embodiment, the ECU 50 functions as the "purge control unit" by executing the processing of steps 200 and 204, and as the "purge termination control unit" by executing the processing of steps 202, 206 and 208.

The invention claimed is:

1. An exhaust gas purification device for an internal combustion engine, comprising:
a bypass passage that bypasses an exhaust passage of an internal combustion engine;
an adsorbent which is disposed in the bypass passage and adsorbs moisture and toxic components in exhaust gas;
a temperature sensor that detects a temperature of the adsorbent; and
an electronic control unit programmed to execute an adsorption operation which allows inflow of the exhaust gas to the bypass passage until an amount of the moisture that has flowed into the adsorbent reaches an allowable moisture inflow amount; wherein
the electronic control unit is programmed to determine the allowable moisture inflow amount based on the temperature of the adsorbent when a purge operation to purge the moisture and toxic components adsorbed to the adsorbent has been executed at an immediately preceding time.

2. The exhaust gas purification device according to claim 1, wherein the bypass passage bypasses the exhaust passage between a pre-catalyst and a post-catalyst disposed in the exhaust passage.

3. The exhaust gas purification device according to claim 1, wherein the allowable moisture inflow amount is determined based on a residual moisture amount of the adsorbent before the start of the adsorption operation in the adsorbent.

4. The exhaust gas purification device according to claim 3, wherein the adsorbent includes a toxic component adsorbent that adsorbs primarily toxic components, and a moisture adsorbent which is disposed on an upstream side of the toxic component adsorbent and has a function to adsorb the moisture, and the residual moisture amount is a residual moisture amount in the moisture adsorbent.

5. The exhaust gas purification device according to claim 1, wherein the electronic control unit is further programmed to calculate an adsorption operation execution time threshold so that the moisture amount which flows into the adsorbent becomes the allowable moisture inflow amount;
wherein the electronic control unit is further programmed to measure, during execution of the adsorption operation, adsorption time elapsed since the start of the adsorption operation and allow inflow of the exhaust gas to the bypass passage until the adsorption time reaches the adsorption operation execution time threshold.

6. The exhaust gas purification device according to claim 1, wherein the electronic control unit is further programmed to calculate an exhaust gas amount threshold so that the moisture amount which flows into the adsorbent becomes the allowable moisture inflow amount; and
wherein the electronic control unit is further programmed to measure, during execution of the adsorption operation, an integrated exhaust gas amount since the start of the adsorption operation and allow inflow of the exhaust gas to the bypass passage until the integrated exhaust gas amount reaches the exhaust gas amount threshold.

7. The exhaust gas purification device according to claim 3, wherein the electronic control unit is further programmed to determine the residual moisture amount based on a temperature of the adsorbent, said temperature being the temperature of the adsorbent at the termination of the purge operation.

8. An exhaust gas purification device for an internal combustion engine, comprising:
a bypass passage that bypasses an exhaust passage of an internal combustion engine;
an adsorbent which is disposed in the bypass passage and adsorbs moisture and toxic components in exhaust gas;
a passage switching valve that switches between a state of allowing inflow of exhaust gas into the bypass passage and a state of not allowing inflow of exhaust gas into the bypass passage;
a temperature sensor that detects a temperature of the adsorbent; and
an electronic control unit programmed to execute:
a residual moisture amount acquisition operation for acquiring at least one of a residual moisture amount before the start of an adsorption operation by the adsorbent in the adsorbent or a correlated value thereof;
an adsorption correction operation for correcting a termination condition of the adsorption operation to decrease a period during which the adsorption operation is executed as the residual moisture amount increases, based on results of the acquisition by the residual moisture amount acquisition operation when the adsorption operation is executed; and
a purge operation for purging the moisture and toxic components adsorbed by the adsorbent;
wherein the residual moisture amount acquisition operation acquires a temperature of the adsorbent which is detected by the temperature sensor in the immediately preceding purge operation as the correlated value of the residual moisture amount.

9. The exhaust gas purification device according to claim 8, wherein the bypass passage bypasses the exhaust passage between a pre-catalyst and a post-catalyst disposed in the exhaust passage.

10. The exhaust gas purification device according to claim 8, wherein the passage switching valve selects the state of allowing inflow of the exhaust gas into the bypass passage when the adsorption operation is executed, and selects the state of not allowing inflow of the exhaust gas into the bypass passage when the termination condition of the adsorption operation is satisfied.

11. The exhaust gas purification device according to claim 8, wherein the adsorbent includes a toxic component adsorbent that adsorbs primarily toxic components and a moisture adsorbent which is disposed on an upstream side of the toxic component adsorbent and has a function to adsorb moisture, and the residual moisture amount is a residual moisture amount in the moisture adsorbent.

12. The exhaust gas purification device according to claim 8, wherein a termination condition of the adsorption operation is that an elapsed time since the start of the adsorption operation reaches a predetermined adsorption operation execution time threshold, and the adsorption correction operation corrects the predetermined adsorption operation execution time threshold to be decreased as the residual moisture amount increases.

13. The exhaust gas purification device according to claim 8, wherein a termination condition of the adsorption operation is that an integrated exhaust gas amount since the start of the adsorption operation reaches a predetermined exhaust gas amount threshold, and the adsorption correction operation corrects the exhaust gas amount threshold to be decreased as the residual moisture amount increases.

14. The exhaust gas purification device according to claim 13, further comprising an air flow meter that detects an intake air amount, wherein the adsorption correction operation calculates the integrated exhaust gas amount based on the intake air amount detected by the air flow meter.

15. The exhaust gas purification device according to claim 8, wherein the electronic control unit is further programmed to execute a purge termination operation for terminating the purge operation when the temperature of the adsorbent reaches a predetermined temperature.

16. The exhaust gas purification device according to claim 8, further comprising:
a temperature sensor that detects a temperature of the adsorbent;
wherein the electronic control unit is further programmed to execute a purge operation to purge the moisture and toxic components adsorbed to the adsorbent; and
a purge termination operation that terminates the purge operation when the temperature of the adsorbent reaches a predetermined temperature.

17. An exhaust gas purification method for an internal combustion engine having: a bypass passage that bypasses an exhaust passage of an internal combustion engine; an adsorbent which is disposed in the bypass passage and adsorbs moisture and toxic components in exhaust gas; a temperature sensor that detects a temperature of the adsorbent; and a passage switching valve that switches between a state of allowing inflow of the exhaust gas into the bypass passage and a state of not allowing inflow of the exhaust gas into the bypass passage, the method comprising:

acquiring at least one of a residual moisture amount before the start of a adsorption operation by the adsorbent in the adsorbent or a correlated value thereof;

correcting a termination condition of the adsorption operation to decrease a period during which the adsorption operation is executed as the residual moisture amount increases, based on results of the acquisition by a residual moisture amount acquisition unit when the adsorption operation is executed;

purging moisture and toxic components adsorbed into the adsorbent;

acquiring a temperature of the adsorbent which is detected by the temperature sensor in the immediately preceding purge operation as a correlated value of the residual moisture amount; and terminating the purge operation when the temperature of the adsorbent reaches a predetermined temperature.

* * * * *